United States Patent
Willebeek-LeMair et al.

(10) Patent No.: US 12,395,501 B2
(45) Date of Patent: Aug. 19, 2025

(54) SECURITY EVENT CONNECTIVITY GENERATED BY LINKING ENITITIES AND ACTIONS FROM PROCESS TRACKING

(71) Applicant: Spyderbat, Inc., Austin, TX (US)

(72) Inventors: Marc Willebeek-LeMair, Austin, TX (US); Brian Smith, Ft. Worth, TX (US); Ian Spencer Nelson, Mead, CO (US); David Tyree, Evergreen, CO (US); Seth Goldhammer, Boulder, CO (US)

(73) Assignee: Spyderbat, Inc., Austin, TX (US)

( * ) Notice: Subject to any disclaimer, the term of this patent is extended or adjusted under 35 U.S.C. 154(b) by 23 days.

(21) Appl. No.: 17/470,818

(22) Filed: Sep. 9, 2021

(65) Prior Publication Data
US 2022/0078199 A1    Mar. 10, 2022

Related U.S. Application Data

(60) Provisional application No. 62/706,763, filed on Sep. 9, 2020.

(51) Int. Cl.
*H04L 9/40*    (2022.01)

(52) U.S. Cl.
CPC .......... *H04L 63/1416* (2013.01); *H04L 63/10* (2013.01); *H04L 63/1425* (2013.01); *H04L 2463/146* (2013.01)

(58) Field of Classification Search
CPC . H04L 63/1416; H04L 63/10; H04L 63/1425; H04L 2463/146
See application file for complete search history.

(56) References Cited

U.S. PATENT DOCUMENTS

| | | | |
|---|---|---|---|
| 8,973,141 B2 | 3/2015 | Rowland et al. | |
| 9,071,637 B2 | 6/2015 | Smith et al. | |
| 10,630,703 B1* | 4/2020 | Ghosh | H04L 63/1408 |
| 2007/0107052 A1* | 5/2007 | Cangini | G06F 21/554 |
| | | | 726/22 |

(Continued)

FOREIGN PATENT DOCUMENTS

| | | | | |
|---|---|---|---|---|
| CN | 1488097 A | * | 4/2004 | G06F 9/4843 |

OTHER PUBLICATIONS

C. Xosanavongsa, E. Totel and O. Bettan, "Discovering Correlations: A Formal Definition of Causal Dependency Among Heterogeneous Events," 2019 IEEE European Symposium on Security and Privacy (EuroS&P), Stockholm, Sweden, 2019, pp. 340-355. (Year: 2019).*

(Continued)

*Primary Examiner* — Jeremy S Duffield
(74) *Attorney, Agent, or Firm* — Zagorin Cave LLP; Robert W. Holland

(57) ABSTRACT

A system and method automatically links security events associated with a computer network and system calls of plural networked computers interfaced with the computer network. System call information of the system calls of the plural networked computers are communicated to a network location to associate security events with system calls across the networked computers and provide a causal graph that reconstructs a sequence of events with precise attribution and timing to comprehend entities and actions associated with the security event.

18 Claims, 9 Drawing Sheets

(56) References Cited

U.S. PATENT DOCUMENTS

| | | | | |
|---|---|---|---|---|
| 2014/0157407 | A1* | 6/2014 | Krishnan | G06F 21/53 |
| | | | | 726/22 |
| 2015/0074808 | A1* | 3/2015 | Quinn | G06F 21/57 |
| | | | | 726/23 |
| 2015/0264077 | A1* | 9/2015 | Berger | G06F 21/51 |
| | | | | 726/23 |
| 2016/0191465 | A1* | 6/2016 | Thomas | H04L 63/0263 |
| | | | | 726/1 |
| 2016/0373476 | A1* | 12/2016 | Dell'Anno | G06F 21/552 |
| 2017/0032120 | A1* | 2/2017 | Tolpin | G06F 21/53 |
| 2018/0351979 | A1* | 12/2018 | Mandrychenko | G06F 16/1734 |
| 2020/0059481 | A1* | 2/2020 | Sekar | H04L 63/1425 |
| 2020/0120118 | A1* | 4/2020 | Shu | G06F 21/54 |
| 2020/0201989 | A1* | 6/2020 | Shu | G06F 21/577 |
| 2021/0105613 | A1* | 4/2021 | San Miguel | H04W 12/63 |
| 2021/0409981 | A1* | 12/2021 | Yan | H04L 43/024 |

OTHER PUBLICATIONS

Infoq, "A Gentle Introduction to eBPF," May 3, 2021, downloaded from https://www.infoq.com/articles/gentle-linux-ebpf-introduction/ on Feb. 22, 2022, 9 pages.

New Relic, "What is eBPF and Why Does it Matter for Observability?," Apr. 23, 2021, downloaded from https://newrelic.com/blog/best-practices/what-is-ebpf on Feb. 22, 2022, 8 pages.

Lwn, "A Thorough Introduction to eBPF," downloaded from https://lwn.net/Articles/740157/ on Feb. 22, 2022, 6 pages.

* cited by examiner

```
int pid = clone();
if (pid != 0) {
        // Parent
        wait4(pid);
} else {
        // Child
        execve("/bin/cat", "foo");
}
``` syscall_openat
pid: 2855
path: "/home/vagrant/foo"
exit: 0
time: 1900000.05 syscall_clone
pid: 2850
cwd: "/home/vagrant"
exit: 2855
args: ["/bin/bash"]
time: 1900000.00 syscall_execve
pid: 2855
exe: "/bin/cat"
cwd: "/home/vagrant"
args: ["bin/cat", "foo"]
exit: 0
time: 1900000.01 model_process
id: "proc:....:2855"
version: 1
pid: 2855
ppid: 2850
cwd: "/home/vagrant"
args: ["/bin/bash"]
time: 1900000.00
valid_from: 1900000.00 model_process
id: "proc:....:2855"
version: 2
pid: 2855
ppid: 2850
cwd: "/home/vagrant"
args: ["/bin/cat", "foo"]
time: 1900000.01
valid_from: 1900000.00

FIG. 5

SECURITY EVENT CONNECTIVITY GENERATED BY LINKING ENITITIES AND ACTIONS FROM PROCESS TRACKING

CROSS-REFERENCE TO RELATED APPLICATION(S)

This application claims benefit of provisional application 62/706,763 filed Sep. 9, 2020, entitled "Automated Method of Security Event Connectivity", naming Marc Willebeek-LeMair and Brian Smith as inventors, which application is incorporated herein by reference.

BACKGROUND OF THE INVENTION

Field of the Invention

The present invention relates in general to computer network security, and more particularly to security event connectivity generated by linking entities and actions from process tracking.

Description of the Related Art

A major challenge in cybersecurity alert analysis and computer forensics including cyber security and general debugging is the inability to easily understand or reconstruct a timeline of events or trace the origin or linkages between particular actions, events, or entities (such as users, files, processes, login sessions or machines). Given a particular event it is very difficult and time consuming to trace the origin of the event or subsequent actions or entities related to that event. In cyber security analysis (forensics) it is common to receive a security alert with certain event information that may include timing, entity and/or action information that only depicts a narrow window or point in time of a much lengthier and complex related set of actions and entities. Without the full context it is difficult to understand the origin, scope or impact of a security event in order to effectively address the problem. For example, given a security event that represents an attack on a computer system, it is difficult to determine whether the attack was successful, what subsequent actions were taken by the attacker, or what configuration changes may have left the system vulnerable to the attack.

This challenge is exacerbated when the sequence of events spans across multiple machines (physical or virtual), and the resources involved are ephemeral. The current approach relies on highly specialized skills and experience to collect relevant data and piece together a timeline, and consumes costly resources to investigate.

SUMMARY OF THE INVENTION

Therefore, a need has arisen for a system and method which provides security event connectivity generated by linking entities and actions from process tracking.

In accordance with the present invention, a system and method are provided which substantially reduce the disadvantages and problems associated with previous methods and systems for managing network security. System call information gathered at networked computers and provided to a network location is used to track processes initiated and terminated in coordination with network security events to provide a coherent overview of network operations and threats in a network causal relationship graph. In one example embodiment, network security threat levels from the causal relationship graph are applied to provide automated triage actions that proactively protect network integrity, such as blocking clients and/or processes from network access.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 depicts a data model relating system calls and security events as causal relationships;

DETAILED DESCRIPTION

A system and method are provided that link information associated with system operations at networked computers to security events detected at the network to provide a causal relationship between system level operations and the security event. In depth analysis of system operations information and network security events provides a causal graph that offers a focused view of relationships between operations at network clients and the security event to determine a cause of the security event and to take corrective actions. Real time tracking and analysis of system calls at networked computers translates to security events, in part through temporal relationships, so that automated corrective actions are initiated based upon security event severity and identified causes, such as specific networked computers related to a network attack. For example, tracking process life cycle objects at networked computers based upon system calls offers temporal and network-interface details that provide a basis for relationships to security events so that networked computers related to the identified process life cycles may be targeted by security measures to address security events, such as blocking the networked computer network access or communications related to the network socket associated with the security event. The following example embodiment describes instructions that execute on networked computers, such as at an operating system level and at network nodes, to define and generate a causal relationship graph. The instructions are distributed to networked computers and network nodes, such as within operating systems and security applications, and are stored in non-transitory memory, such as flash memory of a solid state drive, for retrieval to and execution on processing resources of the networked computers and network nodes.

Figure 1:
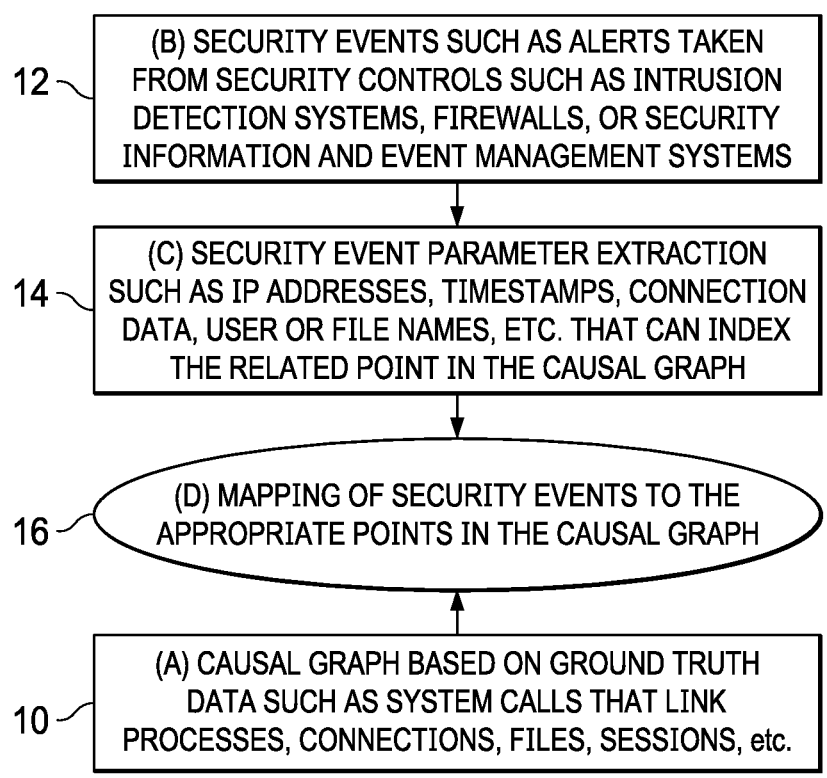
FIG. 1 depicts an automated causal attack sequence generator.

Referring now to FIG. 1, an automated causal attack sequence generator is depicted. The example embodiment of the automated causal attack sequence generator provides detection of causal relationships between security events and network node operations with four related logical functions. At 10, a causal graph is generated based upon ground truth data retrieved from networked computers, such as system calls detected at an operating system level that link processes, network connections, files, sessions and other system call information across networked computers and time. At 12, security events are detected at network security devices, such as alerts taken from security controls like intrusion detection systems (IDS), firewalls, or security information and event management systems (SIEM). Taken alone, these security events provide information related to detected events, but generally lack clear indications of the source of the events across specific networked computers and nodes. At 14, security event parameters are extracted from the detected security events, such as Internet Protocol (IP) addresses, timestamps, connection data, user and/or file names, etc. The security event parameters provide a basis for tying the security event to system operations data collected from networked computers as system call information so that causal relations may be deduced and presented in a causal graph. At 16, the ground truth data and security event parameters are mapped to points on a causal graph that visually depicts the relationships between security events and processes of networked computers. For example, causal graph nodes may center about temporal relations determined from timestamps, data-centric relations determined from stored data accesses and/or network relations determined from network communication parameters like a relationship to a network socket process initiation and termination. A severity of a particular causal node may be based upon the number and strength of relationships determined between the security event and the system call information.

Figure 2:
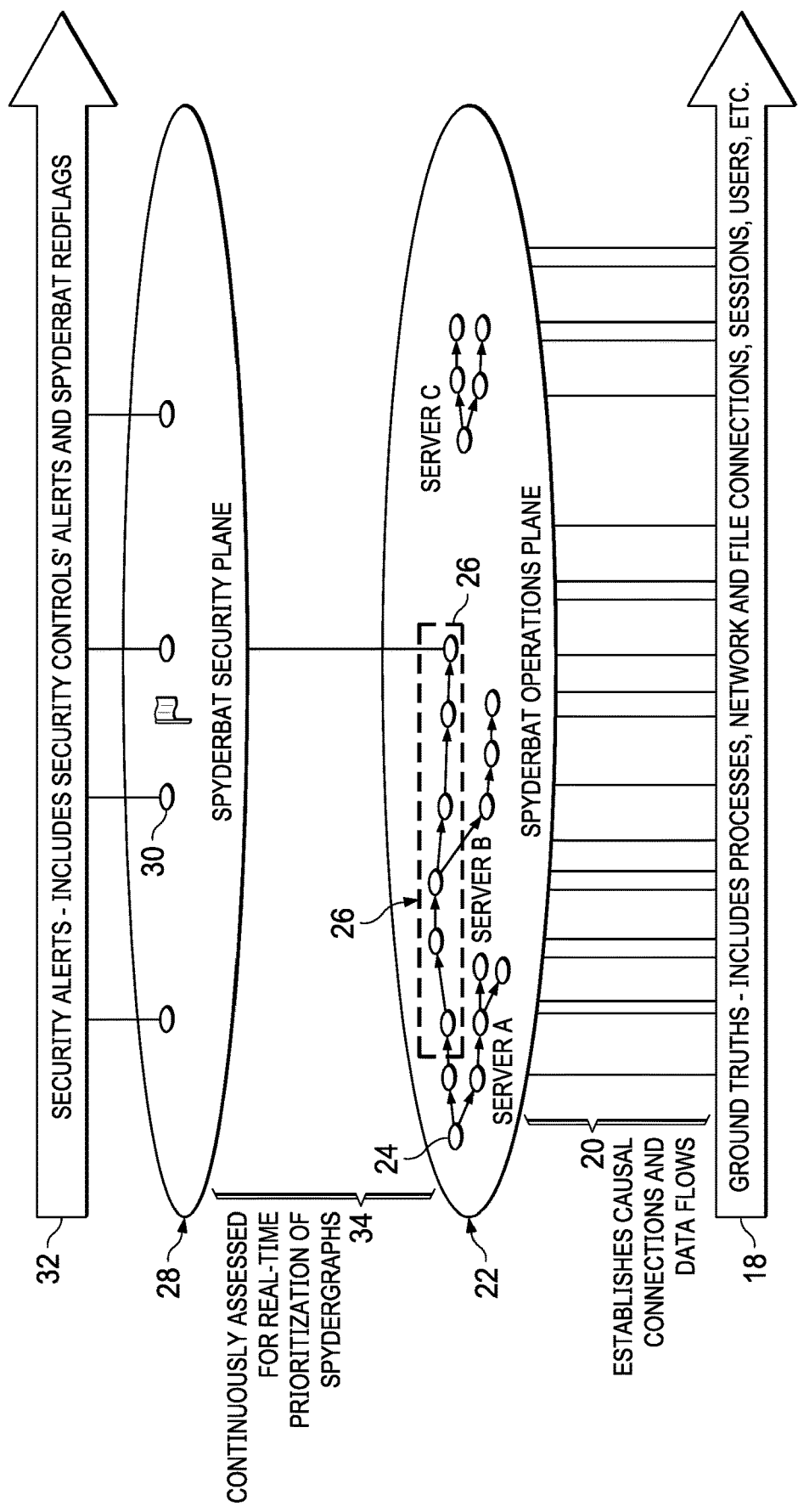
FIG. 2 depicts an example of attack sequence detection across a multiplicity of physical and virtual systems.

Referring now to FIG. 2, an example of attack sequence detection across a multiplicity of physical and virtual systems is depicted. In the example embodiment, the attack sequence detection is provided with the four logical blocks depicted by FIG. 1 to provide security alert consolidation that suppresses false positive indications while offering early attack recognition. Stateful incidents track to all security alerts to provide context as to the nature and severity of the security alerts. An operations plane tracks security event states and networked computer operations across highly dynamic environments, such as a native cloud environment, to provide a focused visibility of the root cause activities and threat scope for each security alert. At levels 18 and 20, ground truths are discovered and tracked from the networked computers by tracking process life cycle objects selected as indicated by level 20 to derive causal connections and data flows. Level 22 provides a spyderbat operations plane with plural spyderbat operations data nodes 24 tracked from operating system calls at networked computers. In the example embodiment, three server computers provide system call information that, for example, illustrate process life cycles at each server to include parent processes and children processes spawned by parents over time. Relationships between the different computer data nodes, such as network addresses, timestamps, file references and other relationships, allow a cross-system data relationship 26 to be defined. At a security alert level 32, security alerts and related parameters are reported to a spyderbat security plane 28 and mapped as security alert data 30. A comparison of the security alert data and data from the process life cycles tracked by the spyderbats in the operations plane by continuously assessed for real-time prioritization of spydergraphs 34 reveals relationships of networked computer operations and security alerts in an intuitive manner that may be presented as a causal relationship graph and acted upon. Various examples of these relationships are described in greater detail below.

In order to link all related entities and actions on a computer or collection of computers, such as physical or virtual machines, accurately reconstructed sequences of events with precise attribution and timing as they occurred are described. Entities may include, but are not limited to:

Process: all actions performed by a running computer program. Attributes include start and stop time, executable, machine, parent process, command line, session, environment, file descriptors, terminal, root (of filesystem); Has associated open/close, connection, and spawn events.

Sessions: When a user authenticates and is authorized, a session starts. Sessions have start and end times, associated users, terminal, remote IP (if applicable), authentication tokens and lead process.

Open files

Connections: represent communications with other processes or machines

Users: are parts of groups, have a name and a uid

Machines: hostname, network interfaces, configuration information, (kernel modules, software packages), storage devices, operating system type, build number, version.

Hosts: DNS name and/or IP

Security: configuration of firewalls, permissions of sensitive data, security events Files: md5, create date, mode, machine, directory, users/groups, inode, device Directories: parent, owner, device, mode, users/groups Open Files: During the lifetime of a process, files, folders, and network connections may be opened. Such objects are referred to as handles or file descriptors. Their attributes include open/close time, file descriptor. In the case of disk files, additional attributes include filename, device, permissions, hash, and inode. In the case of network connections, additional attributes include network protocol, remote IP and port, local IP and port, and remote DNS name.

Furthermore, actions may include, but are not limited to, launching of a process, initiation of a session, opening a connection, opening, reading, or writing a file or directory, or executing a file. The creation and maintenance of a set of data structures that track all entities and actions provides reconstruction of security events at a computer network with a detailed view of the networked computers and nodes involved and their relationships. The structures also maintain the necessary tags to record the relationships between entities and actions. The relationships are ascertained through various methods including:

A) parsing of log files (e.g., windows event logs, web server logs, database logs, linux system logs), B) queries using appropriate operating system calls;

C) purpose built programs to discover linkages;

D) System execution tracing programs (e.g., sysdig, kernel tracing, audit logs on Linux, ETW logs on windows);

The resulting data structure forms a causal graph that maintains the entire history of all entity and action relationships across one or more machines (physical or virtual). Given any single entity, event, or action and timing, the related causal graph can be retrieved to fully comprehend the timing and relationship between that entity or action and all related entities or actions. This is highly valuable for alert investigation and forensic analysis of computer systems for cyber security or other operational analysis.

Figure 3:
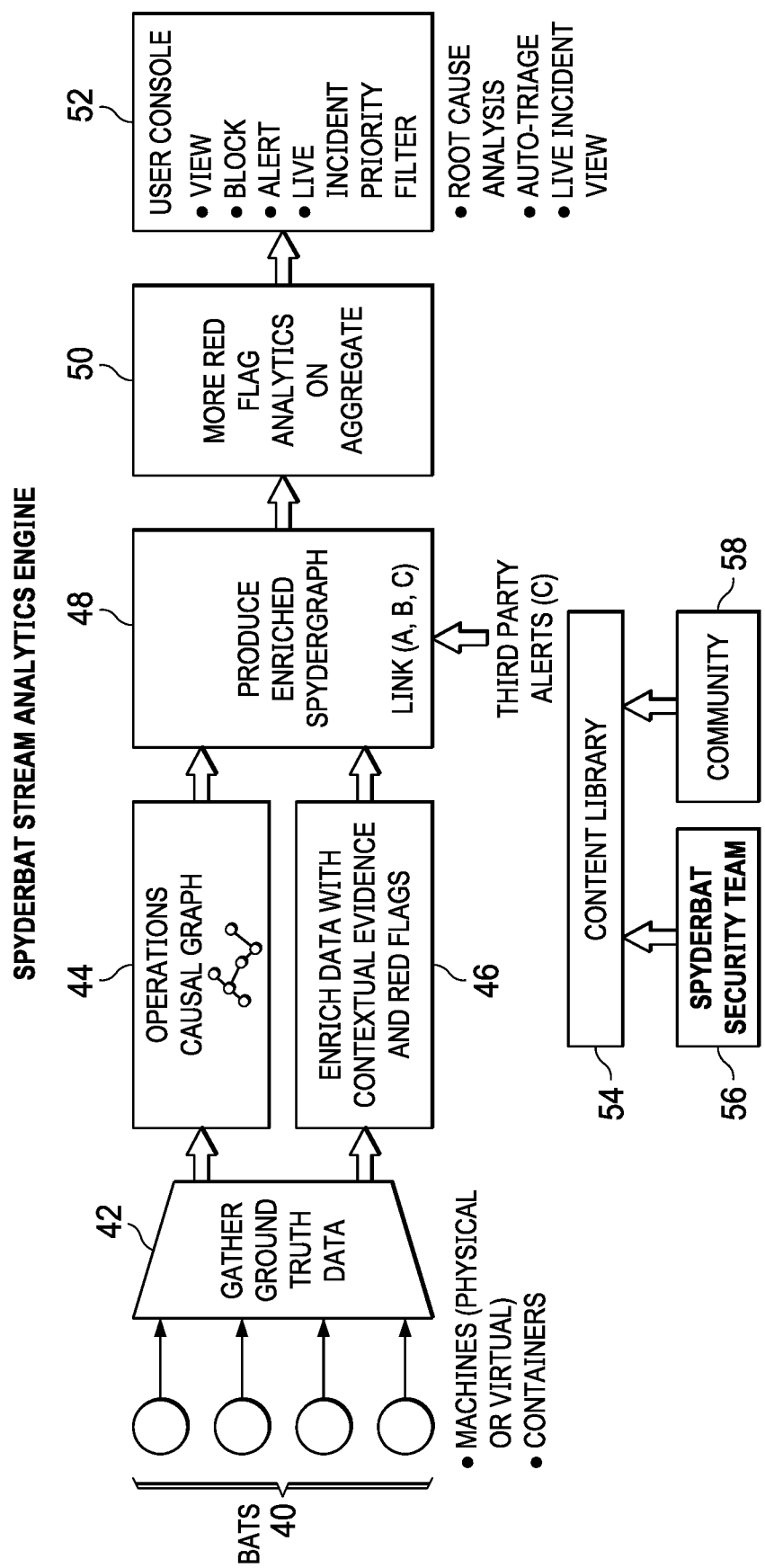
FIG. 3 depicts a security event causal sequence generation system via stream processing.

Referring now to FIG. 3, a security event causal sequence generation system via stream processing is depicted. Bats 40 execute as instruction kernels or similar modules integrated at an operating system level to track system calls. For example, each bat 40 is a small ephemeral program run on a client computer to gather information or take actions, such as enforce security responses communicated from a network location. In one example embodiment, bats 40 may be eBPF kernels or similar operating system level logical modules that track process control blocks like process initiation and termination. Bats 40 generate "truth" data at 42 that represents a state at each monitored client, such as by aggregating system call information. At 44, the system information is organized as a causal graph, as is depicted, that relates the system information, such as with process identification, network interface information and/or temporal information. At 46, the system call information is enhanced with contextual evidence and red flags, such as modeled data relating to security events. At 48 an enhanced spydergraph is generated by detecting causal relationships between the system information and parameters associated with security events, such as events detected by third party security alerts. For example, causal relationships may be defined as links A, B and C that share a common process and/or temporal relationship. At 50 further analysis provides red flag analytics on the aggregate of data, such as by labeling one or more of links A, B and C as good or bad. At 52 the causal relationship graph of step 44 enhanced by additional analysis and comparisons with security alert parameters is presented at a used console that provides manual and automated actions commanded back to bats 40, such as blocking devices or network communications, alerting based upon severity, a live incidence priority filter with colors, textual messages or other attributes, a root cause analytical tool that shows a live incident view and automated triage that commands corrective actions based upon security event severity and the nature of the correlation with the root cause. A content library 54 provides context for defined network conditions and can include product specific tools of a Spyderbat security team 56 and community based tools 58, such as templates that help to define security alerts of consequence and automated actions. The result is an evidence based abstraction and future proofed cloud native architecture that enables a highly scalable event stream processing engine with custom analytics, including a causal graph and red flags. As an example, system call information is tracked to monitor process life cycles that can include initiation and termination of network sockets. Monitoring socket address buffers with identifiers of the buffers helps to track sockets and to mirror structures from an operating system. A comparison between clients and servers provides a temporal tracking of network interfaces that can aid in tracking malicious actors. In one example embodiment, a hash of the first 500 bytes of a network socket provides an efficient way to track a network connection across plural physical and virtual machines using system call information.

Figure 4:
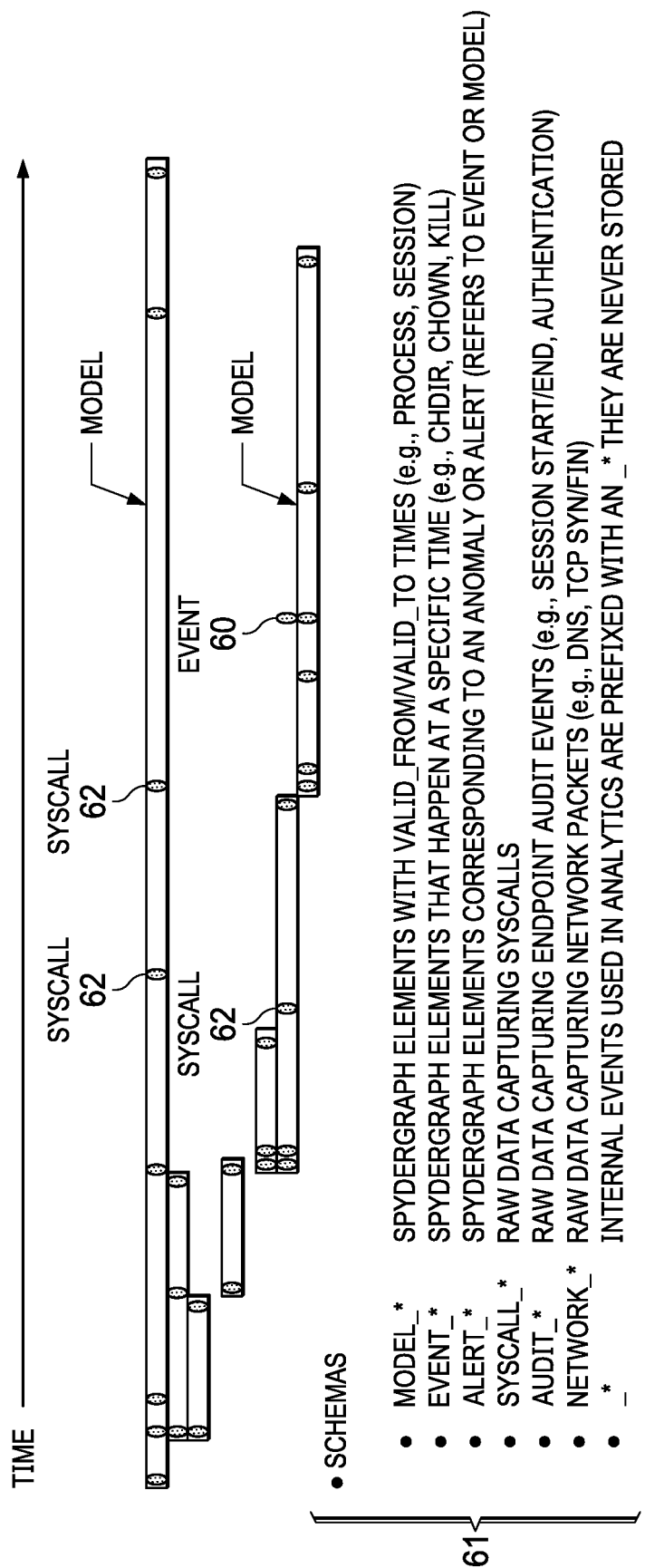
FIG. 4 depicts an example data model having causal relationships to security events.

Referring now to FIG. 4, an example data model that implements the above system and method is depicted having causal relationships to security events. The depicted schema 61 illustrates raw data collected from system calls 62 over time that are compared against security events 60 to find causal relationships as described above.

Referring now to FIG. 5, a data model relating system calls and security events as causal relationships is depicted. System calls tracked as raw data track through model processes that help to tie causal relationships between physical and virtual system across a network.

Figure 6:
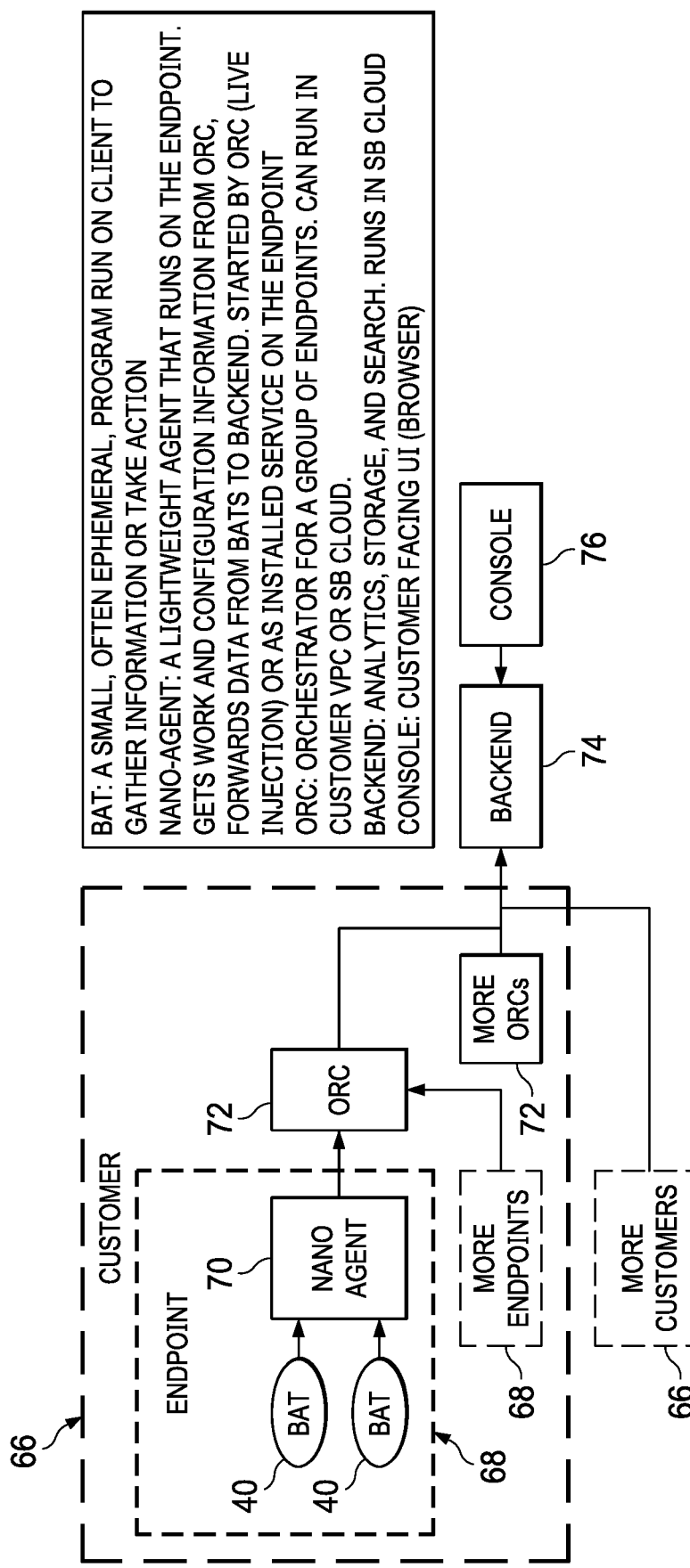
FIG. 6 depicts a block diagram of a system architecture for managing system call monitoring at a network location.

Referring now to FIG. 6, a block diagram depicts a system architecture for managing system call monitoring at a network location. At one or more customer networks 66, plural endpoint networked computers 68 execute an operating system that includes one or more bats 40 to monitor system calls and related processes at an operating system level. A Nanoagent 70 executes as an application over the operating system and interfaces with bots 40 for collecting and managing data on the networked computer end point and communicating the data to an orchestrator 72 of the network 66. Nanoagent 70 is a lightweight agent that runs on the end point to get work and configuration information from the orchestrator 72 and to forward data from bats 40 to backend 74. As is described above the series of "bats" are snippets of code used to collect data or perform actions on the endpoint, such as initiating and terminating a process. Nanoagent 70 communicates with orchestrator 72, which serves as a distribution point to scale a large deployment with multiple endpoints 68. The orchestrator communicates with a backend 74 where the analytics to construct the causal graph and detect red flags (security events) is executed. The backend 74 is a network location, such as a physical or virtual server, that also stores data and supports searching of the data and causal graphs. A console 76 connects to the backend 74 and provides a user interface to the system. In one embodiment the orchestrator may provide a live injection start of bats 40 and nanoagent 70 or these elements may be installed as a service on the endpoint. Orchestrator 72 may execute for a group of plural endpoints running in a network 66 as a virtual machine or from a cloud. Backed 74 runs in a cloud or other environment and can provide a console 76 for each network 66 accessible by a customer.

Figure 7:
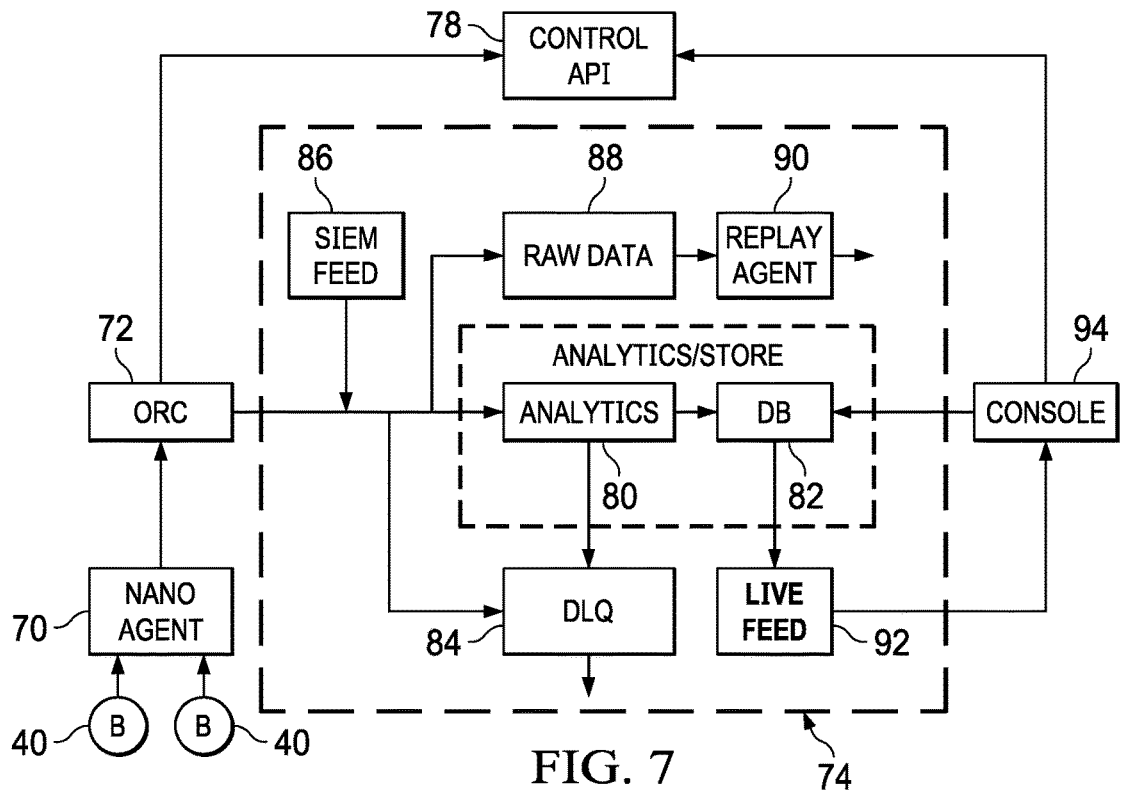
FIG. 7 depicts a data and control flow for managing security events identified with causal relationships.

Referring now to FIG. 7, a data and control flow for managing security events identified with causal relationships is depicted. FIG. 7 illustrates more detail to the backend referenced in FIG. 6 including the ingest of 3rd part security events or alerts from a source such as a SIEM. Bats 40 collect system call information that nanoagent 70 aggregates and communicates to orchestrator 72. As described above, plural networked computers of plural networks may communicate with plural orchestrators 72 to forward information to backend 74 located at a network location. A control API 78 provides access to backend 74 at appropriate levels for orchestrators 72 and a console 94 presents output, such as a causal relationship graph. Orchestrator 72 communicates system call information to an analytics engine 80 that maintains a database 82. Third party network security events may be provided to analytics engine 80 by a SIEM feed 86 or other third party source. A raw data feed 88 provides system call information to a replay agent 90 to presents a replay of activity on the network. Analytics engine 80 passes unneeded information to a dead letter queue 84, such as information associated with errors in gathered data. A live feed 92 presents live output from analytics engine 80 to allow live monitoring and reactions to threats at console 94. As described above, analytics engine 80 compares system call information and security event information to tie operations at networked computers and detected security events to each other in an easily comprehensible manner for presentation at console 94.

Figure 8:
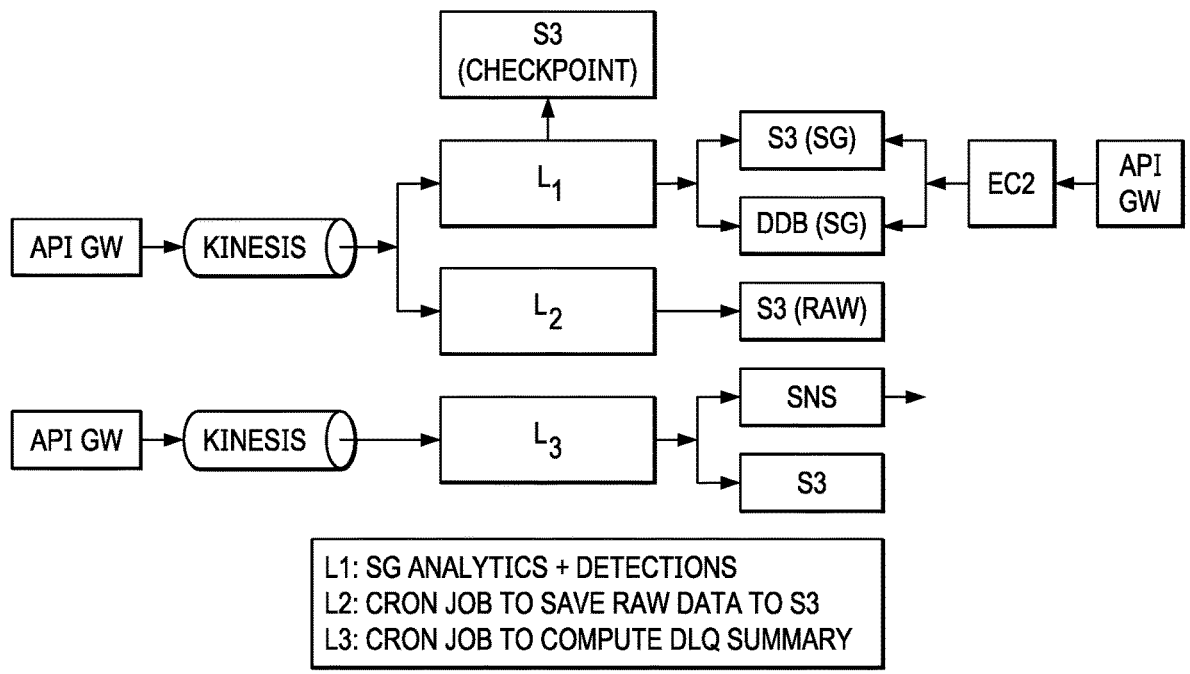
FIG. 8 depicts a data flow details for managing causal graph generation.

Referring now to FIG. 8, data flow details for managing causal graph generation is depicted having an even more detailed implementation of the backend data processing with a highly scalable and performant design. FIG. 8 explores the analytics performed by analytics engine 80 of FIG. 7 to illustrate how a comparison of data is performed that tracks networked computer processes for relationship with security events.

Figure 9A:
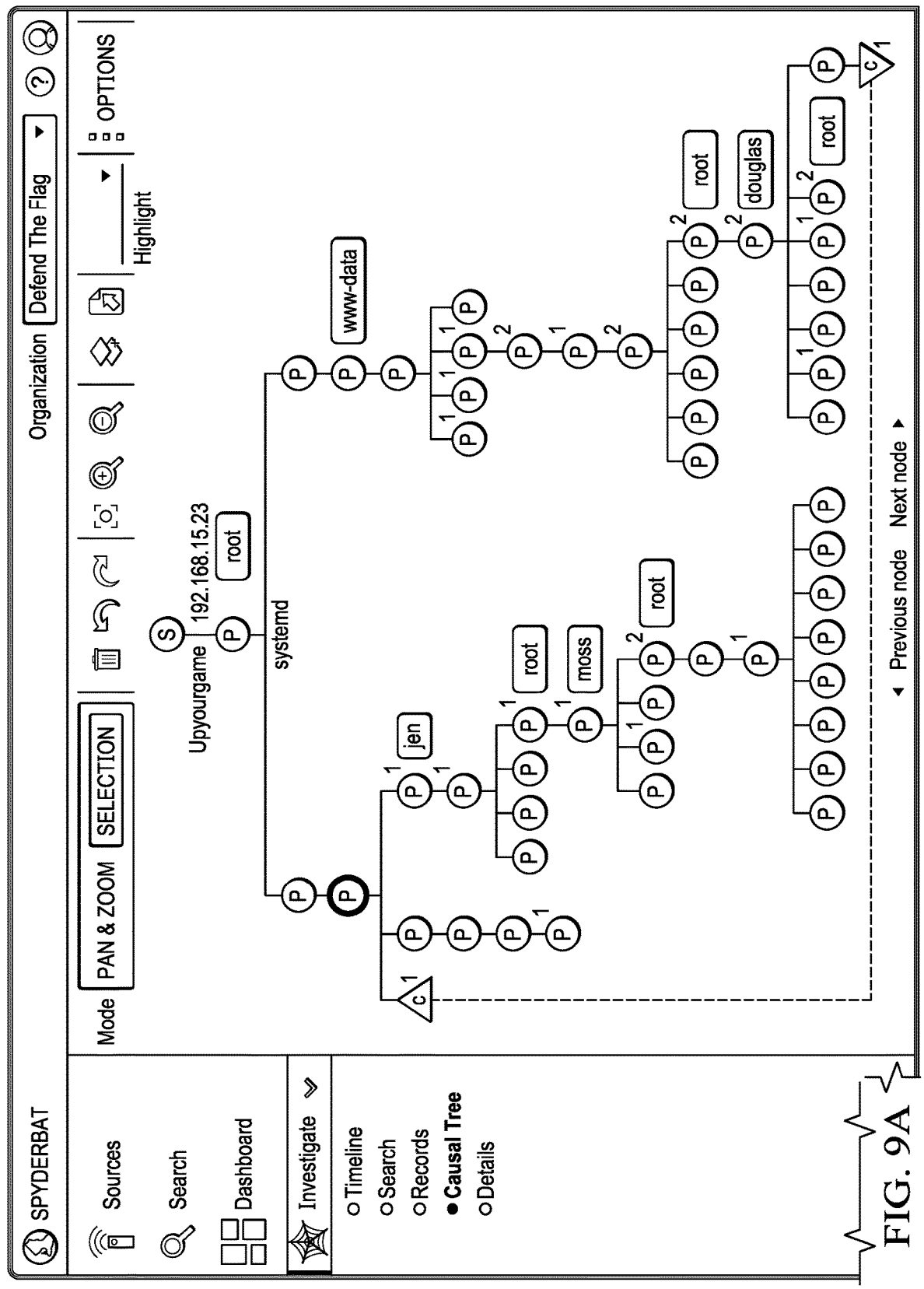
FIGS. 9A and 9B depict an example embodiment of a causal relationship graph.
Figure 9B:
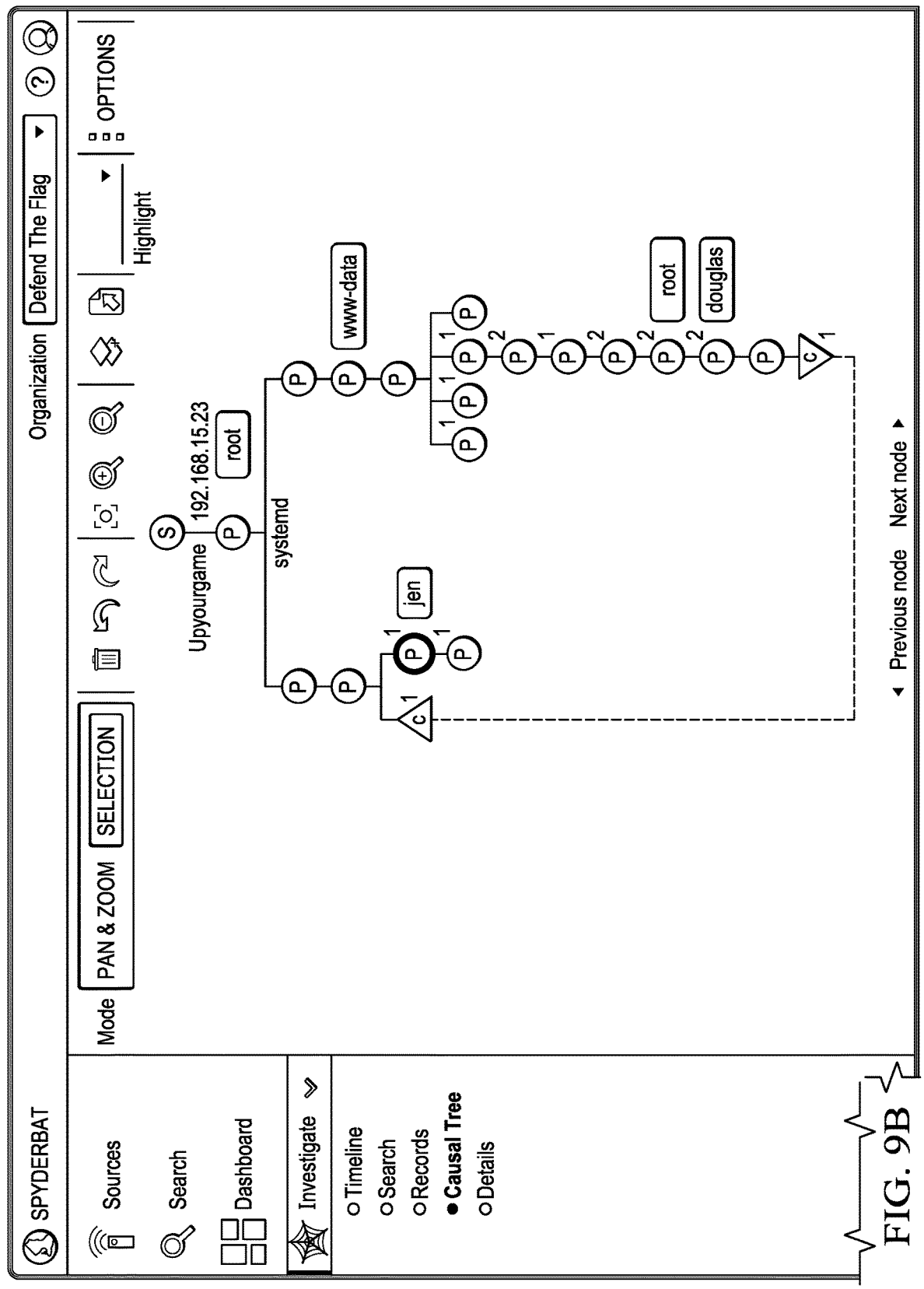

Referring now to FIGS. 9A and 9B depict an example embodiment of a causal relationship graph. In the example, a process initiation is tracked as a root node and related across other nodes based upon commonality in security event parameters and system call information for each of the networked computers. Various geometric shapes and colors are applied at the graph nodes to indicate a relationship to a security event, such as a network socket five tuple relationship across plural network nodes. The spydergraphs provide a statefullness to track network attacks over time and allowing an intuitive view at the root cause of a security event.

As an overview of the above description, the present disclosure provides a method implemented by instructions stored in non-transitory memory for execution on processing resources that automatically links security events across a multitude of physical and virtual networked computers and network nodes, to include: (A) a causal graph consisting of causal relationships between nodes such as processes, connections, files, users, machines, etc; (B) one or more sources of security events; (C) the translation of some information from the security event to find the related node in the causal graph; and (D) the mapping of the security events to the causal graph to unveil the full connectivity and relationship between the full collection of security events, such as security alerts, as depict in FIGS. 1 and 2. In various embodiments: the causal graph is represented by the causal relationship of which node caused the next node to exist including network connections; the causal graph is represented by the reading or writing of data in storage systems including internal and external file systems, databases, and memory; the causal graph is represented by the causal relationship of which node caused the next node to exist to service a network connection; the causal graph is represented by the causal relationship of which node caused the next node to exist via process initiation; and the causal graph is discovered by the operating system calls on each system (physical or virtual) being monitored. In an example embodiment, the causal graph is discovered by examining operating system structures on each system (physical or virtual) being monitored, such as with the bats as described above. As is described above, the security events consist of IDS alerts, EDR alerts, firewall alerts or any form of anomaly detection alerts or aggregation devices such as a SIEM. The linkage between security events and the causal graph is by IP addresses, connection 5-tuples, timestamps, users, file names, file checksums, or any combination of these. In some instances, the causal graph is built in real-time as each new process or connection, etc is created using a stream processing engine and the mapping of security events is performed similarly via the stream processing engine as they are detected, such as is depicted by FIG. 3. The causal graph and associated alerts are combined as each node and alert is detected so as to produce a real-time association of the two planes. In other instances, the combination is performed from a repository of stored data as a non-realtime version. In various embodiments, the causal relationship graph is depicted as a colored directed graph with all related security events and a textual summarization of the security events is provided in written form explaining the sequence of events that occurred. The security events can include Red Flags events that are detected internally based on the system anomalies as well as alerts generated from the causally connected graph. In some instances, the security events are anomalies detected by the system while processing the individual nodes of the causal graph. The security events are detected by analyzing the combined causal graph overlaid with security information. The graph nodes are developed with system call information from physical computers and/or virtual computers, such as virtual machines. The resulting sequence of connected security events, also referred herein to as a Spydergraph, is assigned a severity score using the collective severity of the individual security events and number of security events in the causal graph, such as real time and non-real-time versions. Flags can be included on a causal relationship graph that highlights security events of particular interest. A severity score may be derived, for instance, with a look at the depth of related data trees so that more serious threats are identified with higher scores to provide a network administrator with a measurement of the threat.

Although the present invention has been described in detail, it should be understood that various changes, substitutions and alterations can be made hereto without departing from the spirit and scope of the invention as defined by the appended claims.

What is claimed is:

1. A method for automatically linking security events associated with a computer network having plural networked computers including server computers and client computers, the method comprising:
monitoring system calls at each of the plural networked computers;
aggregating system call information of the monitoring with an agent at each of the plural networked computers, the system call information including at least start time, stop time, parent process and spawn events;
monitoring the network for security events;
identifying a security event;
communicating the system call information from each agent through the network to a network location;
comparing the system call information of the plural networked computers at the network location to identify causal relationships of the security event with the system call information, the comparing including at least comparing start time, stop time, parent process and spawn events of first and second of the plural networked computers to monitor process life cycles that include initiation and termination of network sockets, the network sockets having address buffers tracked by a hash, the network sockets applied to mirror structures from an operating system of each of the plural networked computers and temporally track network interfaces between the server computers and the client computers;
presenting the causal relationships as a causal graph that interrelates the security event and the system call information with the server computers and the client computers; and
blocking at least one of the plural networked computers associated with a causal relationship from a predetermined network access.

2. The method of claim 1 further comprising:
tracking temporal references of the plural security events and the system call information; and
determining the causal relationships of the security events and the system call information by the temporal references.

3. The method of claim 2 wherein at least one of the plural networked computers comprises networked storage and the causal relationship includes a system call to access information in the networked storage.

4. The method of claim 2 wherein a system call comprises a process initiation at the first of the plural networked computers associated with a system call at the second of the plural networked computers.

5. The method of claim 2 wherein the security events comprise one or more of intrusion detection system (IDS) alerts, endpoint detection and response (EDR) alerts, firewall alerts and anomaly detection alerts.

6. The method of claim 2 wherein the comparing system call information further comprises comparing one or more of Internet Protocol (IP) addresses, connection 5-tuples, timestamps, users, file names, and file checksums.

7. The method of claim 2 wherein at least some of the plural networked computers comprise virtual machines and at least some of the plural networked computers comprises physical machines.

8. The method of claim 2 further comprising:
rating a severity of each of the plural causal relationships; and
presenting the severity as plural severity levels, each severity level associated with a color of the causal graph.

9. The method of claim 2 wherein a system call comprises initiation of a network socket.

10. A system for automatically linking security events associated with a computer network having plural networked computers including server computers and client computers, the system comprising:
a first non-transitory memory included in each of the plural networked computers storing first instructions that when executed on a processor of the plural networked computers cause:
monitoring of system calls at the each of the plural networked computers;
aggregating system call information of the monitoring with an agent at each of the plural networked computers, the system call information including at least start time, stop time, parent process and spawn events; and
communicating the system call information from each agent through the network to a network location;
a second non-transitory memory included in the network location and storing second instructions that when executed on a processor of the network location cause:
monitoring the network for a security event;
detecting the security event;
comparing the system call information of the plural networked computers at the network location to identify causal relationships of the security event with the system call information, the comparing including at least comparing start time, stop time, parent process and spawn events of first and second of the plural networked computers to monitor process life cycles that include initiation and termination of network sockets, the network sockets having address buffers tracked by a hash, the network sockets applied to mirror structures from an operating system of each of the plural networked computers and temporally track network interfaces between the server computers and the client computers;
presenting the causal relationships as a causal graph that interrelates the security event and the system call information with the server computers and the client computers; and
blocking at least one of the plural networked computers associated with a causal relationship from a predetermined network access.

11. The system of claim 10 wherein the second instructions further cause:
tracking temporal references of the plural security events and the system call information; and
determining the causal relationships of the security events and the system call information by the temporal references.

12. The system of claim 11 wherein at least one of the plural networked computers comprises networked storage and the causal relationship includes a system call to access information in the networked storage.

13. The system of claim 11 wherein a system call comprises a process initiation at the first of the plural networked computers associated with a system call at the second of the plural networked computers.

14. The system of claim 11 wherein the security events comprise one or more of intrusion detection system (IDS) alerts, endpoint detection and response (EDR) alerts, firewall alerts and anomaly detection alerts.

15. The system of claim 11 wherein the comparing system call information further comprises comparing one or more of Internet Protocol (IP) addresses, connection 5-tuples, timestamps, users, file names, and file checksums.

16. The system of claim 11 wherein at least some of the plural networked computers comprise virtual machines and at least some of the plural networked computers comprises physical machines.

17. The system of claim 11 further comprising:
rating a severity of each of the plural causal relationships; and
presenting the severity as plural severity levels, each severity level associated with a color of the causal graph.

18. The system of claim 11 wherein a system call comprises initiation of a network socket.

* * * * *